July 31, 1962 W. DEN OUDEN 3,047,786
PLURAL CONDITION RESPONSIVE GENERATOR FED MOTOR CONTROL SYSTEM
Filed Dec. 29, 1960
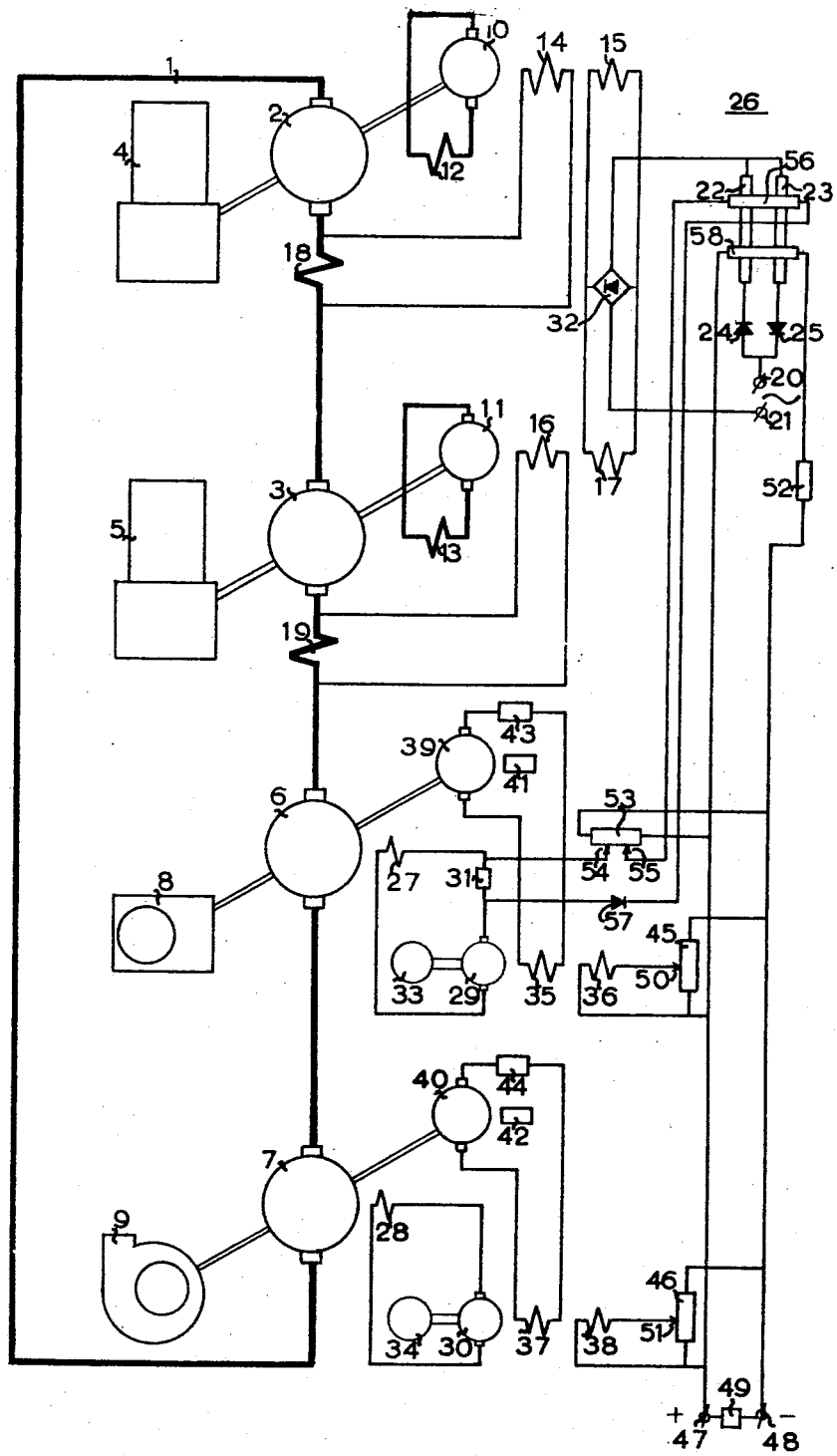

United States Patent Office

> 3,047,786
> Patented July 31, 1962

3,047,786
PLURAL CONDITION RESPONSIVE GENERATOR
FED MOTOR CONTROL SYSTEM
Wouter den Ouden, Slikkerveer, Netherlands, assignor to
N.V. Electrotechnische Industrie Voorheen Willem
Smit & Co., Gemeente Ridderkerk, Netherlands, a
Dutch limited company of the Netherlands
Filed Dec. 29, 1960, Ser. No. 79,446
Claims priority, application Netherlands Dec. 30, 1959
9 Claims. (Cl. 318—153)

The invention relates to an electric system comprising a loop-shaped current circuit including a plurality of direct-current generators and a plurality of direct-current motors, the generators being provided with a control-device acting upon the excitation to hold the current passing through the circuit approximately at a prescribed value. Systems of this kind are known and are termed constant-current system. These systems have the advantage over constant-voltage systems that each motor can be readily caused to run at low speed, even if the torque to be overcome at this speed is small.

It is an object of this invention to provide a system of the kind set forth, which is particularly suitable for use, when one of the motors has to produce, for example, a very high torque at a low speed. This is the case with a hoisting motor of a deep-drilling system, if an extremely long length of tubing is to be hoisted or a jammed drill is to be disengaged.

In accordance with the invention the motors of a system of the kind set forth are each provided with a control-device acting upon the excitation to hold the speed approximately at a prescribed adjustable value, while provision is made for a device to raise the current value across the circuit, the construction of this device being such that the said prescribed value gradually exceeds a fixed, normal value as the energizing flux of a given motor gradually exceeds a given limit value.

Accordingly, the motor which is capable of increasing the current may be proportioned to be appreciably smaller. The desired maximum torque can then be obtained at a high current, which will flow only occasionally and, moreover, for a comparatively short time. Consequently, this current is allowed to exceed the thermally continuously permissible value. If the same torque had to be attained without current increase, the magnetic system had to be designed with greater dimensions and, in fact, the machine to be used had to be designed for an appreciably higher continuous power. The increase in current does not disturb the operation of the implements driven by the other motors, since they are provided with speed control. It is obvious that, when these implements are pumps, which is usually the case with a drilling system for the particular operations requiring a particularly high torque, a torque-control would be, in general, sufficient in a real constant current system with respect to the rapid increase in torque with the speed. A torque-control is, in principle, much cheaper than a speed-control, since in this case no tachometer generator is required and the energizing windings of the rotating amplifiers feeding the energizing winding of the motor concerned are much simpler.

It should be noted that in existing constant-current systems, in which all motors drive implements are of the same kind, for example ship's screws, the prescribed current value is decreased in one or more steps to a low value in the case of very low load of all motors. This control is linked to the control of the load of the motors.

The invention is further based on the recognition of the fact that, although it is allowed to vary discontinuously the prescribed current in the said manner with motors loaded by implements having the characteristics of a pump or ship's screw in the case of low load, it is objectionable in the case of high load to increase the current abruptly with regard to transition phenomena and that it is not desirable to give an order for current increase by means of a separate control-member or to give it by linking it to the order for the motor load. The former is objectionable with a view to the particularly great risk of the current not being immediately reduced as soon as this is permitted, whereas in the latter case it cannot be taken into account that the highest torque is sometimes required at a very low speed; as a matter of course, the order for the motor load must mainly be a speed-control with hoisting systems for reasons of safety.

The invention obviates all these difficulties by increasing the current only and automatically when a high torque is required. Instability is avoided by increasing gradually the prescribed current value from the normal value to a high value in a range of high values of the motor flux.

With motors of conventional design an advantageous proportioning is obtained by choosing the maximum value of the prescribed current approximately one-and-a-half times to twice the normal value of the prescribed current. Adequate stability is ensured without the use of particular expedients if the limit value of the energizing flux beyond which the current in the circuit is increased amounts to approximately half or three quarters of the saturation flux of the motor concerned.

In an advantageous embodiment of the system according to the invention the stability is such that a reference current in a control-device for a generator is a measure for the prescribed value of the current in the circuit, which reference current is obtained by means of a rectifier from an alternating current which passes through the operational windings of a transductor, of which a control-winding conveys a current which varies with the energizing current of the motor concerned. The control-winding concerned is preferably included in a circuit comprising a rectifier and a voltage of opposite polarity and connected to the ends of a resistor included in the energizing circuit of a given motor.

The system according to the invention is particularly important in the case in which the given motor drives the lifting implement of a deep-drilling system, in which the pumps are driven by further motors included in the current circuit.

In a particularly economical design of the system according to the invention the current, occurring at a saturation of the motor determining the current increase, is more than one-and-a-half times the thermally, continuously permissible load current of the machine included in the circuit which is then thermally loaded most.

In order that the invention may be more clearly understood and readily carried into effect, it will now be described more fully with reference to the accompanying drawing, which shows a preferred embodiment.

The drawing shows the circuit diagram of the system concerned.

As shown in the drawing the loop-shaped circuit 1 includes the direct-current generators 2 and 3, which are driven by diesel engines 4 and 5, and the direct-current motors 6 and 7. The motor 6 drives a hoisting implement 8 and the motor 7 drives a pump 9. The shafts of the generators 2 and 3 are provided with exciters 10 and 11, which supply the energizing windings 12 and 13 of the generators 2 and 3. The exciters 10 and 11 are provided with energizing windings 14, 15 and 16, 17 respectively. The windings 14 and 16 are connected across the auxiliary pole windings 18 and 19, respectively, of the generators 2 and 3 respectively. The windings 18 and 19 are traversed by the current of the circuit 1. Across the resistance of the windings 18 and 19 this current produces a low voltage, which produces through the windings 14 and 16, currents which are proportional to the current of the circuit 1. The windings 15 and 16 are fed from an alternating current supplied to the terminals 20 and 21 by an external source, which current passes through the operative or power windings 22, 23 and the rectifiers 24 and 25 of a transductor or magnetic amplifier circuit and is rectified in a rectifying bridge 32.

The motors 6 and 7 are provided with energizing windings 27 and 28 respectively, which are fed from exciters 29 and 30 respectively, while the winding 27 is fed via a resistor 31. The exciters 29 and 30 are driven by motors 33 and 34, which have constant speed.

The exciters 29 and 30 have two energizing windings 35, 36 and 37, 38 respectively. On the shafts of the motors 6 and 7 are seated tachometer generators 39 and 40 respectively. The generators 39 and 40 are provided with permanent-magnet energizations, designated by 41 and 42 and illustrated diagrammatically. The generators 39 and 40 are direct-current machines, which produce voltages proportional to the speeds of the motors 6 and 7 and feed the windings 35 and 37 via resistors 43 and 44.

The windings 36 and 38 are connected to adjustable potentiometers 45 and 46, which are fed from a direct-current source 49, connected to the terminals 47 and 48.

The desired speed of the motors 6 and 7 respectively is obtained by adjusting the tap terminals 50 and 51 of the potentiometers 45 and 46 respectively until the desired value is attained.

From the source 49, via a resistor 52, a control-field 58 of the transductor 26 is supplied so that the desired currents are obtained across the windings 15 and 17.

Finally, the source 49 feeds a resistor 53, on which tap terminals 54 and 55 are provided. Between these tap terminals 54 and 55 a direct voltage is provided which is operative in the circuit of a second control-winding 56 of the transductor 26, which also includes a rectifier 57 and in which also the voltage producing the energizing current of the motor 6 across the resistor 31 is operative. The two voltages have opposite polarities and, if the voltage across the resistor 31 exceeds the voltage between the points 54 and 55, the rectifier 57 begins to pass current and the control-winding 56 starts opening the transductor 26.

The system operates as follows:

When the diesel engines 4 and 5 are brought to the desired speed and the motors 6 and 7 are unloaded, the transductor 26 is controlled by the first control winding 58 only. Thus the windings 15 and 17 are traversed by a given current. These windings energize the exciters 10 and 11, which, in turn, energize the generators 2 and 3. Accordingly, as the current through the windings 12 and 13 increases, the current of the circuit 1 increases. This current is limited by a simultaneous increase in the voltage across the auxiliary pole windings 18 and 19, so that the windings 14 and 16 start conveying a current which counteracts the energization of the exciters 10 and 11. Thus the energizations of the exciter 10 by the windings 14 and 15 will counterbalance each other for the most part and this also will be the case when the motors 6 and 7 are loaded, so that the generators 2 and 3 have to produce an appreciable voltage. The current of the circuit 1 will therefore always have an approximately fixed relation to the current across the windings 15 and 17.

The speed-control of the motors 6 and 7 is obtained by the adjustment of given currents through the windings 36 and 38, which is carried out by adjusting the tap terminals 50 and 51. These windings energize the exciters 29 and 30 and they energize the motors which then start producing a torque and begin to rotate. The tachometer generators convey currents which are proportional to the speeds of the motors 6 and 7 through the windings 35 and 37, the effect of which counter-acts the effect of the windings 36 and 38 and finally counterbalances the latter for the most part. This also applies to the case in which the motors are loaded, so that the speeds of the motors are finally determined mainly by the currents across the windings 36 and 38.

If the hoisting implement 8 and hence the motor 6 have to overcome a high torque, the speed will drop slightly below the adjusted value, so that the counteraction of the energization of the exciter 29 by the winding 35 will decrease slightly. This is sufficient for the exciter to convey a high current through the energization winding 27. When this current has about 70% of the value at which the motor 6 becomes saturated, the voltage across the resistor 31 is equal to the voltage between the points 54 and 55. If the torque increases further, the rectifier 57 begins to draw current and the transductor 26 opens so that the current in the windings 15 and 17 rises and hence the current of the current of the circuit 1 increases. When the current across the winding 27 saturates the motor 6, the current of the circuit 1 has increased approximately to double the normal value, so that for a short time the motor 6 is capable of producing, if necessary, a torque which is approximately 1.8-times the torque of the saturated motor at the normal current. When the hoisting implement operates with the maximum reduction, this means in general a tensile force at which the derrick is loaded to the limit of the safety range.

It should be noted that the direction of rotation of the motor 6 of the hoisting implement cannot be reversed. This is otherwise not required for a drilling system, since the lowering occurs with a disengaged motor on the brake. Of course, it is possible to adapt the arrangement also to the reverse direction of rotation of the motor 6 by introducing a change-over device. An increase in current is usually not required for the operation in the reverse direction.

In summary, there has thus been disclosed an electric system having a loop circuit including at least one direct-current generator and at least one direct-current motor adapted to drive a load, generator control means operative through generator energizing means to maintain a normal substantially constant current in said loop circuit, motor control means operative to maintain the speed of said motor at a predetermined substantially constant value, and system control means responsive to the speed of said motor operative to enable said generator control means to increase said loop circuit current in response to load requirements for said motor above a normal predetermined load output. The maximum value of the increased current in the loop circuit is approximately one-and-a-half times to twice the normal value.

More specifically, an electric system has been disclosed having a loop circuit including at least one direct-current generator and a plurality of direct-current motors, generator control means responsive to loop circuit current adapted to maintain through generator energizing means a normal substantially constant current in said loop, the generator control means includes a transductor supplying a reference circuit, each motor has control means responsive to the speed of its associated motor and operative through motor energizing means to maintain the speed of said associated motor at a predetermined value, and system control means responsive to the energizing means of one of said motors adapted to enable said generator control means to increase the loop circuit current when the energizing flux of one of the motors exceeds a predetermined value. Again the maximum value of the increased current in the loop circuit is approximately one-and-one-half times to twice the normal value. The approximate predetermined value of energizing flux of the one motor in question is one half to three quarters of the saturation flux of the motor in question. The system control means includes a control winding of the transductor which is adapted to receive a current from the energizing means of the one motor after the energizing current has reached a predetermined level. This is accomplished through a rectifier and means for supplying a voltage to the rectifier of a polarity to block the rectifier until a predetermined value of energizing current from the one specific motor is reached. It is to be realized of course that other means may be utilized, such as breakdown sesmiconductor diodes, for providing the control winding of the transductor with current only after the energizing current of the motor in question has reached a predetermined level. The loop current which occurs at a saturation of the motor in question is approximately more than one-and-one-half times the thermally, continuously permissible load current of those machines included in the circuit which is then thermally loaded to the highest degree.

In conclusion, it is pointed out that while the illustrated example constitutes a practical embodiment of the invention, it is not desired to be limited to the exact detail shown since modification of the same may be made without departing from the spirit and scope of this invention.

Having described the invention, I claim:

1. In an electric system having a loop circuit including at least one direct-current generator and at least one direct-current motor; generator control means responsive to loop circuit current adapted to maintain through generator energizing means a normal substantially constant current in said loop circuit; said generator control means including a transductor supplying a reference current; motor control means responsive to the speed of said motor operative through motor energizing means to maintain the speed of said motor at a predetermined value; and system control means responsive to said motor energizing means adapted to enable said generator control means to increase said loop circuit current when the energizing flux of said motor exceeds a predetermined value; said generator control means including said transductor supplying a reference current; said system control means including a control winding of said transductor adapted to receive a current from said motor energizing means.

2. In an electric system having a loop circuit including at least one direct-current generator and at least one direct-current motor; generator control means responsive to loop circuit current adapted to maintain through generator energizing means a normal substantially constant current in said loop circuit; said generator control means including a transductor supplying a reference current; motor control means responsive to the speed of said motor operative through motor energizing means to maintain the speed of said motor at a predetermined value; and system control means responsive to said motor energizing means adapted to enable said generator control means to increase said loop circuit current when the energizing flux of said motor exceeds a predetermined value; said generator control means including said transductor supplying a reference current; said system control means including a control winding of said transductor adapted to receive a current from said motor energizing means, through a rectifier, and means for supplying a voltage to said rectifier of a polarity to block said rectifier until a predetermined motor energizing current value is reached.

3. In an electric system having a loop circuit including at least one direct-current generator and a plurality of direct-current motors; generator control means responsive to loop circuit current adapted to maintain through generator energizing means a normal substantially constant current in said loop; each motor having control means responsive to the speed of its associated motor operative through motor energizing means to maintain the speed of said associated motor at a predetermined value; and system control means responsive to the energizing means of one of said motors adapted to enable said generator control means to increase said loop circuit current when the energizing flux of said one motor exceeds a predetermined value.

4. In an electric system having a loop circuit including at least one direct-current generator and a plurality of direct-current motors; generator control means responsive to loop circuit current adapted to maintain through generator energizing means a normal substantially constant current in said loop; each motor having control means responsive to the speed of its associated motor operative through motor energizing means to maintain the speed of said associated motor at a predetermined value; and system control means responsive to the energizing means of one of said motors adapted to enable said generator control means to increase said loop circuit current when the energizing flux of said one motor exceeds a predetermined value; the maximum value of the increased current in said loop circuit being one-and-a-half times to twice said normal value.

5. In an electric system having a loop circuit including at least one direct-current generator and a plurality of direct-current motors; generator control means responsive to loop circuit current adapted to maintain through generator energizing means a normal substantially constant current in said loop; each motor having control means responsive to the speed of its associated motor operative through motor energizing means to maintain the speed of said associated motor at a predetermined value; and system control means responsive to the energizing means of one of said motors adapted to enable said generator control means to increase said loop circuit current when the energizing flux of said one motor exceeds a predetermined value; said predetermined value of energizing flux of said one motor being one-half to three-quarters of the saturation flux of said one motor.

6. In an electric system having a loop circuit including at least one direct-current generator and a plurality of direct-current motors; generator control means responsive to loop circuit current adapted to maintain through generator energizing means a normal substantially constant current in said loop; said generator control means including a transductor supplying a reference current; each motor having control means responsive to the speed of its associated motor operative through motor energizing means to maintain the speed of said associated motor at a predetermined value; and system control means responsive to the energizing means of one of said motors adapted to enable said generator control means to increase said loop circuit current when the energizing flux of said one motor exceeds a predetermined value.

7. In an electric system having a loop circuit including at least one direct-current generator and a plurality of direct-current motors; generator control means responsive to loop circuit current adapted to maintain through generator energizing means a normal substantially constant current in said loop; said generator control means including a transductor supplying a reference current; each motor having control means responsive to the speed of its associated motor operative through motor energizing means to maintain the speed of said associated motor at a predetermined value; and system control means responsive to the energizing means of one of said motors adapted to enable said generator control means to increase said loop circuit current when the energizing flux of said one motor exceeds a predetermined value; said system control means including a control winding of said transductor adapted to receive a current from the energizing means of said one motor.

8. In an electric system having a loop circuit including at least one direct-current generator and a plurality of direct-current motors; generator control means responsive to loop circuit current adapted to maintain through generator energizing means a normal substantially constant current in said loop; said generator control means including a tranductor supplying a reference current; each motor having control means responsive to the speed of its associated motor operative through motor energizing means to maintain the speed of said associated motor at a predetermined value; and system control means responsive to the energizing means of one of said motors adapted to enable said generator control means to increase said loop circuit current when the energizing flux of said one motor exceeds a predetermined value; said system control means including a control winding of said transductor adapted to receive a current from the energizing means of said one motor through a rectifier, and means for supplying a voltage to said rectifier of a polarity to block said rectifier until a predetermined value of energizing current of said one motor is reached.

9. In an electric system having a loop circuit including at least one direct-current generator and a plurality of direct-current motors; generator control means responsive to loop circuit current adapted to maintain through generator energizing means a normal substantially constant current in said loop; each motor having control means responsive to the speed of its associated motor operative through motor energizing means to maintain the speed of said associated motor at a predetermined value; and system control means responsive to the energizing means of one of said motors adapted to enable said generator control means to increase said loop circuit current when the energizing flux of said one motor exceeds a predetermined value; said loop current which occurs at a saturation of said one motor being more than one-and-a-half times the thermally, continuously permissible load current of that machine included in the circuit which is then thermally loaded to the highest degree.

References Cited in the file of this patent

UNITED STATES PATENTS 2,416,175     Harding et al. _____ Feb. 18, 1947

FOREIGN PATENTS 474,490     Canada _____ June 12, 1951

OTHER REFERENCES

Shoults, Rife, Johnson; Electric Motors in Industry, page 202, Wiley and Sons, New York, 1942.